United States Patent [19]

Pikulski et al.

[11] Patent Number: 4,647,147

[45] Date of Patent: Mar. 3, 1987

[54] FIBER OPTIC TO INTEGRATED OPTICAL CHIP COUPLER

[75] Inventors: Joseph I. Pikulski, Newberry Park; O. Glenn Ramer, Los Angeles, both of Calif.

[73] Assignee: Hughes Aircraft Company, Los Angeles, Calif.

[21] Appl. No.: 572,733

[22] Filed: Jan. 20, 1984

[51] Int. Cl.$^4$ .............................................. G02B 6/36
[52] U.S. Cl. .................... 350/96.17; 350/96.15; 350/96.20; 350/96.10; 350/320
[58] Field of Search ............... 350/96.11, 96.15, 96.16, 350/96.17, 96.18, 96.20, 96.21, 96.22, 320

[56] References Cited

U.S. PATENT DOCUMENTS

| | | | |
|---|---|---|---|
| 4,203,649 | 5/1980 | Velasco et al. | 350/96.11 X |
| 4,294,510 | 10/1981 | Chappell | 350/96.17 |
| 4,296,998 | 10/1981 | Dufft | 350/96.20 |
| 4,307,935 | 12/1981 | Monnier | 350/96.17 X |
| 4,326,771 | 4/1982 | Henry et al. | 350/96.17 |
| 4,403,243 | 9/1983 | Hakamada | 350/96.20 X |
| 4,423,923 | 1/1984 | Frazier et al. | 350/96.15 |
| 4,427,879 | 1/1984 | Becher et al. | 350/96.15 X |
| 4,445,751 | 5/1984 | Divens et al. | 350/96.17 X |
| 4,466,009 | 8/1984 | Konishi et al. | 350/96.20 X |
| 4,523,802 | 6/1985 | Sakaguchi et al. | 350/96.20 X |
| 4,553,811 | 11/1985 | Becker et al. | 350/96.20 |

FOREIGN PATENT DOCUMENTS

| | | | |
|---|---|---|---|
| 0146107 | 11/1981 | Japan | 350/96.17 |
| 0029022 | 2/1982 | Japan | 350/96.15 |
| 0164583 | 10/1982 | Japan | 350/96.17 |

Primary Examiner—William L. Sikes
Assistant Examiner—Akm E. Ullah
Attorney, Agent, or Firm—V. D. Duraiswamy; A. W. Karambelas

[57] ABSTRACT

Optical fibers are clamped by a block onto a substrate. Thereupon, metal is plated over the fibers to hold them in place upon the substrate. The clamp block is removed and the opening, resulting from the clamp block's presence, is then plated in. The built-up metallic body is a coupling which holds the fibers in position so that the ends can be polished for coupling to an integrated optical chip upon a coupling fixture.

11 Claims, 7 Drawing Figures

U.S. Patent Mar. 3, 1987 4,647,147
Fig. 1.
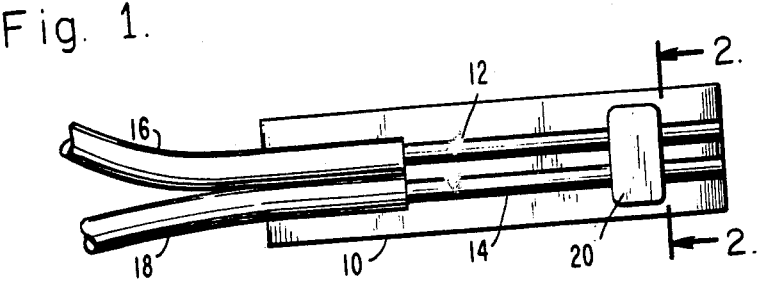
Fig. 3.
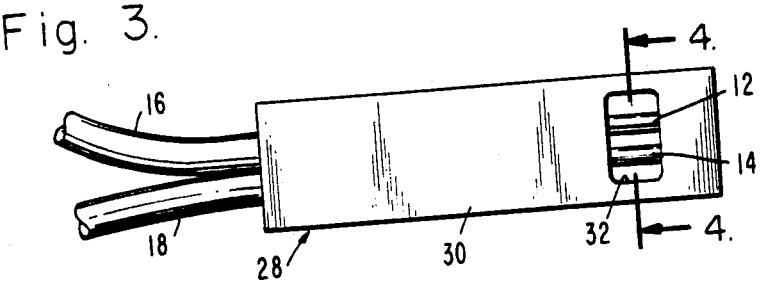
Fig. 5.
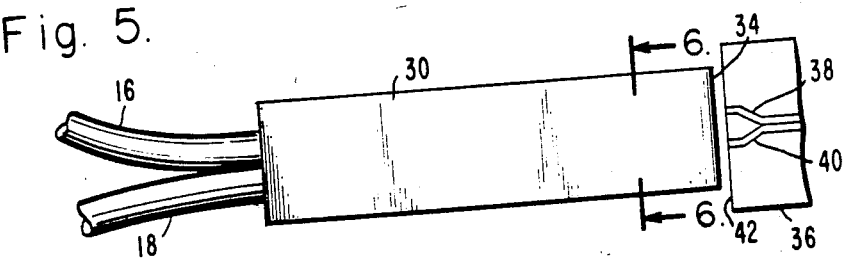
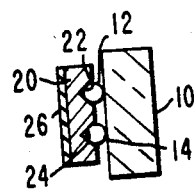
Fig. 2.
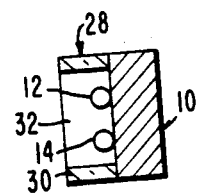
Fig. 4.
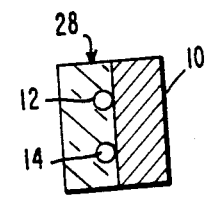
Fig. 6.

FIBER OPTIC TO INTEGRATED OPTICAL CHIP COUPLER

The invention described herein was made in the performance of work under NASA Contract No. NAS 7-100, Jet Propulsion Laboratory Purchase Order 955977 and is subject to the provisions of Section 305 of the National Aeronautics and Space Act of 1958 (72 Stat. 435;42 U.S.C. 2457).

BACKGROUND OF THE INVENTION

This invention is directed to an optical fiber to integrated optical chip coupler wherein either a single or a plurality of optical fibers are securely held in precisely controlled spacing in a metal structure so that the fiber ends can be exposed, polished and coupled to optical channels in an integrated optical chip.

Optical fiber cores are small in diameter and the ends must be accurately coupled to other fibers or devices. Inaccurate coupling causes substantial loss in signal. When there is a plurality of fibers, it is essential that these fibers be maintained in precise relationship to each other. Prior art devices use V-grooves etched in silicon. The fibers are placed in these grooves and are held in place by a flat piece of silicon secured thereover. The silicon cover plate and the fibers are held in place with respect to the V-grooves by means of epoxy adhesive. It must be noted that forces applied to the fiber cause local changes in the index of refraction. Such changes in index cause transmission loss in the fiber. Such local changes are called "microbending." The microbending loss in a fiber due to the use of epoxy adhesive can be 1 decibel or greater. Such losses are objectionable and should be avoided.

SUMMARY OF THE INVENTION

In order to aid in the understanding of this invention, it can be stated in essentially summary form that it is directed to a structure which retains optical fibers in precise relationship to each other so that the fibers may be coupled to an integrated optical chip. At least that portion of the structure which is around the fibers is a metallic structure deposited by plating from solution. Copper is the preferred metal when the optical fibers are to be coupled to an integrated optical chip having a lithium niobate substrate, to fairly well match the thermal coefficient of expansion to maintain optical alignment.

It is, thus, a purpose and advantage of this invention to provide a structure wherein a plurality of optical fibers are held in precise positioning with each other so that the structure can be used for coupling to an integrated optical chip to minimize losses in coupling.

It is another purpose and advantage of this invention to provide a structure which retains at least two optical fibers in position with respect to each other by the deposition of metal out of solution, with the metal being of selected thermal coefficient of expansion to the substrate to which it is to be coupled to minimize losses due to relative thermal expansion between the coupler and the integrated optic substrate.

Other purposes and advantages of this invention will become apparent from a study of the following portion of the specification, the claims and the attached drawings.

BRIEF DESCRIPTION OF THE DRAWINGS

FIG. 1 is a plan view of the arrangement of fibers with respect to a substrate before the structure is completed.

FIG. 2 is a section taken generally along the line 2—2 of FIG. 1.

FIG. 3 is a view similar to FIG. 1, at an intermediate stage in the production of the structure.

FIG. 4 is a section taken generally along the line 4—4 of FIG. 3.

FIG. 5 is a view similar to FIGS. 1 and 3 and is a plan view of the completed coupler structure and showing it in association with an integrated optical chip, which is partly broken away.

FIG. 6 is a section taken generally along the line 6—6 of FIG. 5.

DETAILED DESCRIPTION OF THE INVENTION

Figure 7:
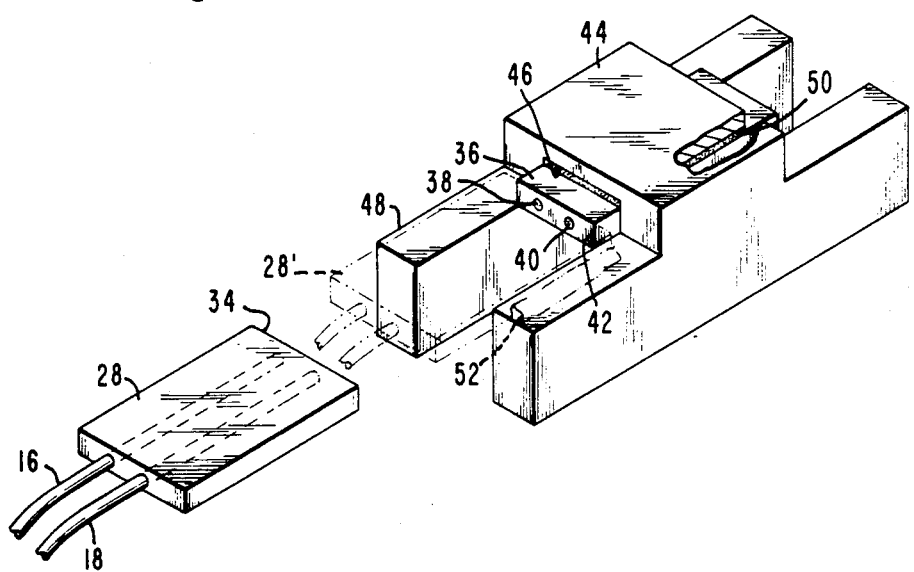
FIG. 7 is a perspective view of a coupling fixture having an interated optical chip mounted thereon with part of the coupling fixture partly broken away and a phantom view mounting of the coupler structure upon the coupling fixture.

FIGS. 1 and 2 show a substrate 10 upon which first and second optical fibers 12 and 14 are positioned. In FIG. 1, the coating has been stripped from optical fibers 12 and 14 at the right end portion thereof, thereby exposing the cladded fiber cores. Portions of optical fibers 12 and 14 are coated, as indicated by 16 and 18 in FIGS. 1, 3 and 5. Clamp block 20 has a pair of V-grooves 22 and 24 therein which respectively engage over the uncoated portion of the first and second optical fibers 12 and 14. A layer of low electrical conductivity film is attached over the top of clamp block 20 to avoid electro-deposition of metal thereon. An adhesive backed polymer film such as common transparent mending tape is suitable for this purpose.

The beginning assembly shown in FIGS. 1 and 2 is produced for the purpose of holding the optical fibers in position so that plated metal may be deposited thereon. The integrated optical chip 36, to which the coupler structure 28 is to be mated, has a substrate made of lithium niobate. Substrate 10 can be made of copper to closely match the thermal index of expansion of the lithium niobate substrate. The coating of the fibers may be a layer of an electrically conductive inorganic material such as aluminum. When there is no electrically conductive coating, a conductive film of vapor deposited silver or gold can be applied to the areas where a plated body is to be built up. Clamp block 20 is made of a material which will not be retained in place by the metal deposited out of solution. A silicon clamp block in [1 0 0] orientation with etched-in V-grooves forms V-grooved clamp block 20 which is suitable for this purpose. The assembly of FIGS. 1 and 2 is placed in a plating solution for electroplating a built-up structure upon substrate 10.

FIG. 3 illustrates a copper body 30 as a built-up structure on the substrate 10. Copper is particularly selected because its thermal expansion closely matches that of lithium niobate, lithium niobate -being- the preferred material of the integrated optic chip. Other metals and combinations would be selected for the built-up structural body for other expansion matching purposes.

The copper body 30 is built up by electroplating. A suitable electroplating bath is prepared as follows: Two hundred twenty-five grams of copper sulphate are dissolved per liter of water. Fifty-five grams of sulfuric acid are also added per liter to provide the copper plating electrolyte. Added to the plating electrolyte solution is one-half milliliter of UBAC solution No. 1 per liter of electrolyte. This material is available from Udylite-Omic, 21441 Hoover Road, Warren, Mich. 48089. This mixture acts to improve the fineness of the copper grain in the electrolytic buildup. In the alternative, blackstrap molasses is also useful for the purpose of improving the fineness of the copper grain.

It is critical to the plating that the plating current be a maximum of 180 milliamperes per square inch. A higher current accelerates the ions in the plating solution and this, in turn, produces random orientation which results in graininess. Currents lower than the maximum current improve the fineness of the copper grain. The preferred current is 90 milliamperes per square inch. The plating voltage is from 0 to 3 volts, and the electrolyte temperature is maintained at 70 to 80 degrees F. The concentration of UBAC solution No. 1 in the electrolyte is maintained during the plating operation.

The plating operation must be carefully performed to minimize stresses in the copper plate body which would cause microbending. Microbending, localized changes in the optical fiber's index of refraction, is caused by forces applied to optical fibers 12 and 14 during the plating operation. Copper body 30 is thereby deposited without substantial effect on optical fibers 12 and 14. The result is that the copper body 30 produces a transmission loss of less than 0.1 decibels in the fibers. Plating continues until the copper body 30 is built up to the desired size. When substrate 10 is a part of the finished coupling 28, as is preferred, then the substrate 10 is made of the same material as the deposited body 30, which is copper in this preferred case. However, if it is desired for special cases, the substrate 10 can be made of another material and later separated.

FIG. 3 shows the coupler structure 28 after the first plating step which added the metal body 30 onto substrate 10. At this stage, the V-groove clamp block 20 is removed and the recess 32 in which it lay is seen in FIGS. 3 and 4. The purpose of the clamp block was to hold the fibers in proper relationship during the principal plating operation.

The next step is to add plating into the recess 32 which had contained the clamp block. After that step is accomplished, recess 32 is filled, as shown in FIGS. 5 and 6, optical fibers 12 and 14 are then held in precise relationship. The filling of the recess 32 is by the same plating operation as previously described for the plating of built-up structure 28.

After the plating of the body is completed to form the complete built-up coupling 28, including the filling of recess 32, the structure is ready for preparation for coupling. End face 34 is cut off to expose the ends of the optical fibers. End face 34 is then polished to expose the ends of the optical fibers. Now, the coupling structure is ready for positioning so that the optical fibers join with the optical channels 38 and 40 in an integrated optical chip 36, seen in FIG. 5. Thus, the built-up structure serves as a way to hold the fibers in place, permit their ends to be polished, and finally hold the ends in coupled juxtaposition to associated optical chips.

It is further envisioned that completed coupling 28 and integrated optical chip 36 will be securely coupled together by using a coupling fixture, such as coupling fixture 44 illustrated in FIG. 7. In FIG. 7, coupling fixture 44 has a first reference surface 46 upon which integrated optical chip 36 is mounted by means such as epoxy 50. Coupling 28 is positioned upon the second reference surface 48 of coupling fixture 44 such that end face 34 of coupling 28 abuts against the integrated optical chip end face 42 as illustrated by coupling 28'. The ends of optical fibers 12 and 14, located at end face 34, are then aligned with the ends of optical channels 38 and 40 at end face 42. Techniques by which alignment is performed are well known by those skilled in the art of fiber optics. After alignment is completed, coupling 28 is secured to coupling fixture 44 in the position of coupling 28'. In the preferred embodiment of the invention, coupling fixture 44 is made of copper so that coupling 28 may be secured to coupling fixture 44 by laser welding, thus, forming a laser welded structure 52. Coupling fixture 44 may be made of materials other than copper and epoxing is another means which coupling 28 may be secured thereto.

It is understood that two fibers are illustrated to show the structure and the process. A single fiber or a larger plurality of fibers can also be secured in the manner described. The use of copper is the preferred material of the structure when integrated optical chip 36 is made of lithium niobate.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A coupling structure for retaining first and second optical fibers in fixed position with respect to each other, said structure comprising:
   a substrate having said first and second optical fibers disposed thereon; and
   a built-up metallic body having a face, said body embracing said optical fibers, said fibers extending to said face and said body being built-up on said substrate, said built-up metallic body having a selected thermal coefficient of expansion for matching the thermal coefficient of expansion of an associated integrated optical chip.

2. The coupling structure of claim 1 wherein said substrate is metallic and is the same metal as said body.

3. The coupling structure of claim 1 further including in combination an integrated optical chip wherein said integrated optical chip is made of lithium niobate and said metallic built-up body is copper.

4. The coupling structure of claim 1 wherein said structure is polished on the face which includes the ends of said optical fibers so that said fibers are optically accessible at one face of said body.

5. The coupling structure of claim 4 further including in combination a coupling fixture having a first reference surface upon which said integrated optical chip is mounted, said integrated optical chip having optical channels disposed therein, and a second reference surface upon which said substrate is mounted such that said first and second optical fibers are aligned with said integrated optical chip optical channels.

6. The method of positioning and securing first and second optical fibers with respect to each other to maintain the fibers in fixed relationship to each other comprising the steps of:

providing a substrate;

positioning first and second optical fibers against the substrate;

clamping the first and second optical fibers against the substrate; and depositing metal around and between the fibers so that the fibers are retained in position with respect to each other by a metallic body structure built-up by plating metal from solution.

7. The method of claim 6 including the further steps of:

removing the clamp holding the first and second fibers with respect to the substrate; and depositing metal over the portion of the fibers previously covered by the clamp.

8. The method of claim 7 further including the steps of mounting an integrated optical chip and said body upon a coupling fixture such that said first and second optical fibers are in alignment with said integrated optical chip.

9. A copuling structure for retaining at least one optical fiber in a fixed position comprising:

a substrate;

said fiber lying on said substrate; and a built-up metallic body having a face, said body embracing said fiber, said fiber extending to said face and said body being attached to said substrate, said built-up metallic body having a selected thermal coefficient of expansion for matching with an associated integrated optical chip.

10. The method of positioning and securing at least one optical fiber in fixed position comprising the steps of:

providing a substrate;

positioning said optical fiber on said substrate;

clamping said fiber to said substrate; and depositing metal around and between said fiber so that said fiber is retained in position by a plated metallic body structure.

11. A coupling structure for retaining first and second optical fibers in fixed position, said structure comprising:

a substrate having first and second optical fibers disposed thereon; and a metallic body built-up on said substrate with stresses which could cause microbending of said fibers being reduced during the building-up of said body, said body embracing said fibers and having a face, said fibers extending to said face, said built-up metallic body having a selected thermal coefficient of expansion for matching the thermal coefficient of expansion of an associated integrated optical chip.

* * * * *